US010752818B2

(12) United States Patent
Ellis et al.

(10) Patent No.: US 10,752,818 B2
(45) Date of Patent: Aug. 25, 2020

(54) AUTOMOTIVE ENGINE COOLING SYSTEM STOP-LEAK FORMULATION

(71) Applicant: HOLT LLOYD INTERNATIONAL LIMITED, Manchester (GB)

(72) Inventors: Bruce Ellis, Manchester (GB); Richard Hitchman, Worcestershire (GB); Michael Nash, Stretford (GB)

(73) Assignee: HOLT LLOYD INTERNATIONAL LIMITED, Manchester (GB)

( * ) Notice: Subject to any disclaimer, the term of this patent is extended or adjusted under 35 U.S.C. 154(b) by 0 days.

(21) Appl. No.: 16/135,895

(22) Filed: Sep. 19, 2018

(65) Prior Publication Data
US 2019/0092989 A1    Mar. 28, 2019

(30) Foreign Application Priority Data

Sep. 22, 2017  (GB) .................................. 1715370.1

(51) Int. Cl.
C09K 3/12    (2006.01)
C09K 3/10    (2006.01)
B60K 11/00   (2006.01)

(52) U.S. Cl.
CPC .............. C09K 3/12 (2013.01); B60K 11/00 (2013.01); C09K 3/1028 (2013.01)

(58) Field of Classification Search
CPC ......... C09K 3/12; C09K 3/1028; B60K 11/00
See application file for complete search history.

(56) References Cited

U.S. PATENT DOCUMENTS

| 4,101,494 A | 7/1978 | Kent et al. |
| 4,524,158 A | 6/1985 | Barber |
| 2003/0056691 A1 | 3/2003 | Erick |
| 2011/0126953 A1 | 6/2011 | Incavo |

FOREIGN PATENT DOCUMENTS

| GB | 1218485 | 1/1971 |
| JP | 201253798 | 8/2012 |
| WO | 2007081831 | 7/2007 |

OTHER PUBLICATIONS

Prestone, The Damaging Effects of Choosing the Wrong Antifreeze, 2013, p. 1-28.*
Extended Search Report, European Application No. 18195525.3, dated Mar. 6, 2019.
Examination Report, United Kingdom Application No. GB1715370.1, dated Feb. 28, 2018.

* cited by examiner

*Primary Examiner* — Robert S Jones
(74) *Attorney, Agent, or Firm* — Barnes & Thornburg, LLP; Mark J. Nahnsen

(57) ABSTRACT

The present invention relates to an automotive engine cooling system stop-leak formulation for repairing leaks in an engine cooling system, is compatible with common coolant antifreeze types and is capable of maintaining the repair after draining and re-filling the coolant. The automotive engine cooling system stop-leak formulation comprising a polymeric resin and a particulate package, wherein the particulate package comprises a first natural fibre having a first fibre length and a greater amount of a second natural fibre having a second fibre length.

14 Claims, No Drawings

AUTOMOTIVE ENGINE COOLING SYSTEM STOP-LEAK FORMULATION

CROSS REFERENCE TO RELATED APPLICATIONS

This application claims priority to United Kingdom Application No. 1715370.1, filed Sep. 22, 2017. The disclosure set forth in the referenced application is incorporated herein by reference in its entirety.

INTRODUCTION

The present invention relates to an automotive engine cooling system stop-leak formulation for repairing leaks in an engine cooling system, is compatible with common coolant antifreeze types and is capable of maintaining the repair after draining and re-filling the coolant.

Cooling systems, such as those in motor vehicles, may develop small leaks which are difficult to locate, or may be difficult to repair, for example they may be inaccessible without considerable dismantling of the engine system. While major leaks may require replacement of hoses or gaskets, minor leaks can sometimes be repaired using a formulation added to the coolant Existing products for repairing minor leaks fall into two distinct categories; those based on sodium silicate chemistry that are regarded as permanent repairs, but are not compatible with monoethylene glycol based coolant antifreeze. This is because such compositions produce cross-linked gels in many monoethylene glycol-based antifreeze systems and these can cause cooling system blockages. Another category is the so-called pour and go sealants, based on a range of chemistries, which do mix with monoethylene glycol based coolant antifreeze without causing blockages in the system. Those stop-leak formulations falling into the latter of the two categories can be used without first draining and flushing the engine coolant, a distinct advantage that saves time, money and does not necessitate the user having to be schooled in the art of motor mechanics. However, the repair formed by these products not normally permanent as changing the coolant will typically re-dissolve or wash away the seal. Similarly, these products are usually only suitable for repair of particularly small cracks or pinhole leaks in cooling systems.

Pour and go sealants are added to the coolant and act to plug a leak, but must not block up the restricted passages present in the cooling system. The American Society for Testing and Materials provides a standard method for testing the effectiveness of stop-leak additives for engine coolants, ASTM D3147-06. Most existing formulations marketed in the EMEA region (Europe, Middle East & Africa) are incapable of meeting the requirements of the ASTM D3147-06 standard and this test provides the industry standard against which these products can be evaluated.

There therefore exists a need for a new formulation capable of repairing leaks in engine cooling systems which meets the requirements of car owners, motor manufacturers and repairers and meet existing standards, particularly ASTM D3147-06. Specifically, there is a need for a pour and go formulation that is compatible with engine coolant antifreeze, particularly monoethylene glycol and is capable of forming a permanent repair, preferably a permanent repair even of fairly large apertures in the minor-league category.

There exists a need for a formulation capable of repairing leaks in a way that can be regarded as a permanent repair. For the purposes of this document, permanent is defined by three coolant changes. Modern engine coolants vary in protection, but typically offer up to 5 years or 240,000 kilometres of protection to the cooling system. The average age of a vehicle on the road varies by country, but is less than 10 years anywhere in developed countries across Europe, Middle East, Africa, Asia and North America. Three coolant changes is equivalent to 15 years or 720,000 kilometres and hence represents the useful lifetime of most motor vehicles.

U.S. Pat. No. 4,524,158 discloses a stop-leak composition, comprising a suspension of a fibrillated fibre in an alcoholic antifreeze composition. UK Patent Specification GB1218485 discloses a liquid composition, suitable for use as a leak-stopper in heat exchangers or other vessels designed to hold a liquid, comprising (A) a liquid which is substantially inert to the inside of the vessel and to component B under the conditions of using said composition, and (B) dispersed in component A, substantially spherical particles of a polymeric material insoluble in A wherein the polymeric material of component B contains a polymeric dispersion stabilizer composed of composite polymer molecules having one portion soluble in liquid A and another portion insoluble in liquid A but soluble in the monomer from which the polymeric material of component B is prepared. US 2003/005 6691 discloses a liquid aluminium stop leak formulation for aluminium radiators. The formulation comprising cellulose and polyester with aluminium flakes and a high pH silicate binder but no resin binder. WO2007/081831 discloses a composition for ceiling leaks in an engine, the composition comprising organic and inorganic fibres and a high pH silicate binder. JP 2012 53798 discloses a polyimide resin with low water absorption for use in engine cooling water system parts, such as pipes and housings and which comprises polyamide resin with a fibrous reinforcing agent.

STATEMENT OF INVENTION

The present invention in its various aspects is as set out in the appended claims.

Specifically an automotive engine cooling system stop-leak formulation comprising a polymeric resin and a particulate package, wherein the particulate package comprises a first, preferably natural, fibre having a first fibre length and a greater amount of a second, preferably natural, fibre having a second fibre length.

The present invention provides an automotive engine cooling system stop-leak formulation comprising a polymeric resin and a particulate package, wherein the particulate package comprises oilseed meal and wood flour.

The present invention provides an automotive engine cooling system stop-leak formulation capable of maintaining the repair after draining and re-filling the coolant.

The present invention preferably provides an automotive engine cooling system stop-leak formulation the liquid component which is miscible with monoethylene glycol water mixtures.

The present invention preferably provides an automotive engine cooling system stop-leak formulation the solids component which remains on suspension in monoethylene glycol water mixtures.

Polymeric Resin

The polymeric resin on the present invention is selected to bind with coated or uncoated metal surfaces. The polymeric resin is preferably an acrylate, more preferably a methyl methacrylate-ethyl acrylate copolymer or methyl methacrylate-butyl acrylate copolymer. Without wishing to be bound by theory, the presence of small pendant groups minimise steric hindrance and the high charge allows for a strong affinity for adhesion to metals. The polymeric resin is most preferably a copolymer of methyl methacrylate and butyl acrylate. The copolymer may have an average molecular weight between 200 000 and 300 000 Daltons using the Mz measure. More preferably the copolymer has an average molecular weight between 100 000 and 400 000 Daltons using the Mz measure. Suitable means for determining molecular weight of this material can be found in Andrzej, R., Piotr, M., Agnieszka, K., 'Determination of absolute molar mass distribution', Annals of Warsaw University of Life Sciences—SGGW, Forestry and Wood Technology 2010 No. 72 pp. 206-2120

Preferably the copolymer is added to the formulation in a solvent, such as toluene, which allows the polymeric resin to be easily mixed with the other ingredients of the formulation.

In the present invention the polymeric resin preferably has a glass transition temperature between 30° C. and 80° C., more preferably between 40° C. and 60° most preferably between 45° C. and 55° C.

Cooling systems relevant to the present invention operates at a nominal temperature of around 88° C. It is therefore at and around this temperature, in particular in the temperature range 80 to 100° C. that the composition of the present invention is effective in carrying out sealing. However, the composition of the present invention is further advantageous in that it remains on suspension and does not precipitate solids at temperatures as low as 10° C. This is important because modern cooling systems are typically kept under pressure and opening the system to add the anti-leak component at operating temperature can be hazardous. Clearly, a leaking cooling system may not be under pressure but the residual degree of pressure is not normally apparent. Further objective of the present invention is therefore the provision of an automotive engine cooling system stop-leak formulation miscible with a water monoethylene glycol composition in the temperature range 10 to 100° C.

The combination of molecular weight and the glass transition temperature serves to define the molar ratio of the monomers in the copolymer suitable for carrying out the present invention.

Particulate Package:

The particulate package of the present invention comprises two or more fibres. They are here termed a first and second fibre. The fibres are preferably organic fibres, more preferably natural fibres, most preferably cellulose or cellulose based fibres. The organic fibres are preferably wood flour and an oilseed meal fibre. The organic fibres are preferably of different average lengths (as measured by light microscopy) and form a bimodal fibre length distribution. Other fibre types are, for example, synthetic organic fibre such as poly ethylene terephthalate and nylon. Metal fibres are not preferred as these can create galvanic corrosion. The fibre preferably has a glass transition temperature above normal engine operating temperature, here taken as 150° C., hence, cellulose is preferred.

The wood flour is preferably a softwood fibre. Such materials are produced by grinding and sifting softwoods such as spruce and pine, provides fine particles in the formulation. Preferably, the wood flour has a moisture content of less than 15%, and a particle size as determined by screening of 100 µm to 600 µm. That is to say, less than 1% of the particles are retained by a 600 µm screen and at least 90% are retained by a 100 µm screen. Less than 40% of the fibres are retained by a 300 µm screen.

The first fibre length is in the range 50 µm to 500 µm and the second fibre length is in the range 1 to 25 µm. The first fibre is preferably the aforementioned wood flour. The second fibre is preferably the aforementioned oilseed meal fibre. This measure is derived using optical microscopy and measuring the silhouette of 200 fibres.

The first fibre length preferably has a weight average first fibre length is 100 µm to 300 µm and the weight average second fibre length is 10 µm to 20 µm. This measure is derived using optical microscopy and measuring the silhouette of 200 fibres and assuming that the longest length defined a cylinder length and a width perpendicular to the length represents a diameter and calculating a weight contribution to an average by assuming the particles are represented as solid cylinders. This measure is preferable as measuring small fibres is problematic and this measure diminishes their effect on the measure.

The oilseed meal may be a rapeseed meal or a linseed meal and is preferably an expelled linseed meal, a by-product of linseed oil production where the oil is expelled from the seeds. Oilseed is particularly preferred as it contains residual amounts of linoleic and of α-linolenic fatty acid was approximately 2:1 from the oilseed pressing process and these provide a degree of adhesion, possibly through in situ polymerisation, at engine operating temperatures. For this reason, more preferred is linseed meal. The composition of the present invention providing a long-lasting leak repair which is not dissolved away when new coolant is introduced. The weight values when representing the second fibre are to the fibre plus residual oil. The residual oil can be in the range of 5 to 50% of the overall weight, preferably from 20 to 25% of the weight. The weight of fibre to oil can be determined by weighing, and extraction with acetone, drying and weighing. The oil component, particularly of linseed oil, is considered to have functional effect and provides better sealing than without. Specifically, the ability to withstand refilling of coolant is improved.

In the formulation of the present invention the weight ratio of the shorter fibre to the longer fibre is preferably between 1:2 and 1:12, preferably between 1:4 and 1:8 and most preferably 1:5.6.

In the formulation of the present invention the particulate package when of wood flour and oilseed meal is preferably between 1:2 and 1:12, preferably between 1:4 and 1:8 and most preferably 1:5.6 weight ratio.

Interaction of Polymeric Resin and Particulate Package (of the First and Second Fibres)

It has been found that the formulation of the present invention of the polymeric resin, the wood flour and the oilseed meal interact together to provide a seal for coolant leaks in admixture with monoethylene glycol water mixtures and as determined using ASTM D3147-06. This without blocking the cooling system. Without wishing to be bound by theory, it is believed the sealing capability with regards to particulate material is linked with how these materials behave at the site of the leak. Due to its size the fine wood flour cannot aggregate to a large enough clump to seal a slot. Instead a piece (or pieces) of oilseed meal which are irregular in shape migrate to the leak site. The resin provides additional bulk and cling so that in the brief time a piece of oilseed meal is held at the leak site before it is forced through, wood flour and the resin fill the spaces between the oilseed meal. This arrangement stacks on itself eventually providing a seal. The combination of the selected resin with the two types of fibrous material, having a bimodal particle size distribution, provides a surprisingly good seal in a short period of time. This may be due to polymerisation of the wood fibre and the oilseed meal. Once the resin has set, after the coolant has reached the glass transition temperature of the resin, the materials are bonded together to form a permanent seal.

The weight ratio of polymeric resin:particulate package may be between 1:0.1 and 1:2, that which has been found to be more effective is between 1:0.5 and 1:1.5, optimally 1:1.05.

Additives

Embodiments of the present invention may contain additives to maintain the performance; an antifoam product may be added to the formulation to limit foaming. In other embodiments an antimicrobial product may be added to inhibit the growth of microorganisms which may lead to blockages in the coolant system. In still further embodiments a buffer additive to regulate pH is included in the formulation. The preferred buffer range is pH 6 to 9, more preferably pH 6.5 to 8.0, a preferred buffering agent is trisodium citrate. Buffering the composition is possible as silicate binder is not present, silicate binder provides a particularly high pH and in combination with hot coolant fluid is particularly corrosive and dangerous to use, particular in contact with the skin or eyes. The present composition is therefore much safer.

DETAILED DESCRIPTION

A stop-leak formulation 15MN002 was blended according to the following formula:

TABLE 1

| Ingredient | % w/w |
| --- | --- |
| Water | 88.07 |
| Buffer, trisodium citrate | 1.00 |
| Sodium hydroxide | 0.14 |
| Expelled linseed meal | 2.82 |
| Acrylic resin copolymer in solvent | 7.00 |
| Wood flour | 0.50 |
| Antifoam | 0.20 |
| Antimicrobial | 0.25 |
| Colourant | 0.02 |

A stop-leak formulation is blended into water, using a ratio of wood flour:expelled linseed meal of 1:5.6 for the particulate package and a ratio of 1:1.05 acrylic resin copolymer to particulate package.

Thermoplastic resins to use in this embodiment were selected on a number of different criteria including block copolymer combination, solubility parameters, available form and solvent systems, glass transition temperature, molecular weight, density.

In these tests the resin was provided as specified, Form No. 884-000174-0612-NAR-EN-CDP being a methyl methacrylate-butyl acrylate copolymer of Mz 250,000 and Tg 50° C., containing polymer 45% solids in toluene. As the coolant vessel cools and the resin reverts back towards its glass state the packing is sufficiently regular to maintain a seal even though the seal becomes increasingly brittle particularly in low molecular weight polymers. A resin that is too brittle may rupture when pressure is introduced to the vessel.

The following comparative formulations were also tested:

TABLE 2

| Ingredient | Comparative 1 % w/w | Comparative 2 % w/w | Comparative 3 % w/w |
| --- | --- | --- | --- |
| Water | 88.07 | 88.07 | 88.07 |
| Buffer, trisodium citrate | 1.00 | 1.00 | 1.00 |
| Sodium hydroxide | 0.14 | 0.14 | 0.14 |
| Expelled linseed meal | 3.32 | 0.0 | 2.82 |
| Resin as specified | 7.00 | 7.00 | 0.00 |
| Polyacrylic acid | 0.00 | 0.00 | 7.00 |
| Wood flour | 0.00 | 3.32 | 0.50 |
| Antifoam | 0.20 | 0.20 | 0.20 |
| Antimicrobial | 0.25 | 0.25 | 0.25 |
| Colourant | 0.02 | 0.02 | 0.02 |

Polyacrylic acid, Tg 109° C. was of equivalent Molecular weight and of the same solution concentration as the Resin as specified. In the present invention glass transition temperature can be determined using ASTM E1356-08(2014) Standard Test Method for Assignment of the Glass Transition Temperatures by Differential Scanning Calorimetry.

The formulations were then subject to testing to simulate the conditions in a vehicle coolant system.

Test Method

Development formulations together with a suite of competitor products were evaluated using a stop-leak additives performance test method from the American Society for Standards and Materials, ASTM D3147-06.

The ASTM D3147-06 method comprises providing a rectangular stainless steel 12 to 13.5 litre vessel designed to contain up to 140 kPa pressure. Heaters and pumps are provided to enable testing over a range of temperatures and pressures. Test plates constructed of solid brass are attachable to the reservoir with a gasket. Test plates may have slits 12.7 mm long and various widths. Test plates may have three holes each of the same size, or nine holes of various sizes. Test are defined to measure the leakage through the holes after adding the stop-leak product to coolant, simulating the conditions of operating a car engine, such as running at a temperature of between 84° C. and 92° C. and a pressure of between 88 kPa and 118 kPa The sealing test used to assess the present invention was broken down into six steps, based on the ASTM D3147-06 standard. A stainless steel vessel, circulation pump and heater are provided, and connected to pressurisation equipment. Along adjacent faces of the vessel are spaces in which interchangeable brass plates with holes or slots may be inserted. Plates with a hole size of 0.762 mm (0.030") and slots of 0.254 mm (0.010") were chosen for the final testing. Plates having holes and slots of these sizes were chosen as these are the largest holes advisable according to the ASTM that a stop-leak product should seal without the possibility of causing harm to a vehicle's cooling system. As some products could not pass the test at these sizes, they were also tested with a smaller hole size of 0.508 mm (0.020").

Step 1 comprises adding the coolant and the stop-leak formulation, 214 ml to 12 l of coolant (monothylene glycol and water 50/50 by volume) to the vessel and then heating to about 88° C. The coolant and formulation mixture is circulated using a pump.

Step 2 comprises pressurising the test sample to 103±15 kPA (15±2 psi) while maintaining the temperature and circulation for two hours.

Step 3 comprises allowing the sample to cool with no circulation while maintained at a test pressure of 103±15 kPA (15±2 psi) for a duration of 12 to 20 hours to simulate overnight conditions.

Step 4 comprises releasing the pressure, then reheating the sample with the circulating pump turned on, and once the temperature reaches 88° C., pressurising the vessel to 103±15 kPA (15±2 psi) again.

Step 5 comprises allowing the system to cool to room temperature.

Step 6 comprises pressurising the system again and running the system for a further hour.

Sealing performance was evaluated by recording lost fluid together with various other parameters and observations recorded in a general format, including volume of fluid loss and ambient and solution temperatures as described by ASTM D3147-06. In order to 'PASS' a formulation must maintain a minimum working volume of 4.5 litres throughout the duration of the test.

Furthermore, a no-harm test used in the ASTM standard comprising two aspects was carried out. The first is a sieve test, the sample coolant and formulation mixture is screened through an 850 µm sieve both before and after the test, and evidence of gumming, gelling or visible particles that may block engine components such as radiator tubes are considered to be a failure.

The second is a blockage test, which is carried out by replacing the plates used in the performance test to larger ones representative of the size of the coolant pathways or the radiator. These slots are 0.635 mm wide and 12.7 mm long. To pass this test there must be no seal formed on the slit or holes, allowing the coolant to drain from the system freely. This is therefore representative of the formulation not blocking any pathways in the cooling system.

Test Results

The present invention performed to a higher level than any current product on the market. The new formula exhibited a 100% pass rate on the ASTM D3147-06 sealing test and maintained an effective seal after 3 subsequent drain and re-fill exercises.

In the following table the results of testing formulation 15MN002 and a number of products available on the market at the time of testing are compared.

TABLE 1

Test results using plates with a hole size of 0.762 mm (0.030") and slots of 0.254 mm (0.010").

| Designation | Number of Tests | Number of Passes | Pass rate | Note |
|---|---|---|---|---|
| 15MN002 | 36 | 36 | 100% | |
| Bars Leak TM | 3 | 1 | 33% | smaller holes only passed |
| Carlube TM | 4 | 2 | 50% | smaller holes only passed |
| K-Seal TM | 7 | 1 | 14% | |
| Wurth TM | 1 | 0 | 0% | |
| Wynns TM | 3 | 1 | 33% | |
| Comparative 1 | 1 | 0 | 0% | |
| Comparative 2 | 1 | 0 | 0% | |
| Comparative 3 | 1 | 0 | 0% | |

Table 1 shows that none of the existing markets could reliably pass the ASTM D3147-06 test using plates with a hole size of 0.762 mm (0.030") and slots of 0.254 mm (0.010"). Further, the data shows that the combination of the two natural fibres used in combination with the preferred polymer type is better than the fibres were when used individually.

Formula 15MN002 passed this test 100% of the time. The formula also passed the same test after four refills of the test vessel with fresh coolant, indicating that it exceeds the requirements for a permanent repair as defined in this specification.

The formula also passed the important no-harm test, designed to ensure the small bore holes within a cooling system remain unblocked when a cooling system stop-leak product is used. In this test, the formula must allow free draining of the coolant. The new formula produced a 'PASS', in good fashion with laminar flow.

The competitor products were unable to reliably pass the ASTM D3147-06 sealing test.

The present invention offers an improve stop-leak products which seal holes in engine cooling systems.

The present invention can be practically applied in the form of a new product that will serve to function as a superior engine cooling system leak repair.

The test results demonstrate that the new formula is superior in all aspects that were tested. Furthermore, the seal can be regarded as permanent based on the definition within this document. By permanent, in this application, it is taken to mean that the sealing effect persists even after three replacements of coolant in a system following a repair.

The invention claimed is:

1. An automotive engine cooling system stop-leak formulation comprising a polymeric resin and a particulate package, wherein the particulate package comprises a first fiber having a first fiber length and a greater amount of a second fiber having a second fiber length, wherein the first fiber length is in the range 50 µm to 500 µm and the second fiber length is in the range 1 to 25 µm.

2. The automotive engine cooling system stop-leak formulation of claim 1 wherein the weight average first fiber length is 100 µm to 300 µm and the weight average second fiber length is 10 µm to 20 µm.

3. An automotive engine cooling system stop-leak formulation comprising a polymeric resin and a particulate package, wherein the particulate package comprises a first fiber having a first fiber length and a greater amount of a second fiber having a second fiber length, wherein the weight ratio of the first to the second fiber is from 1:2 to 1:12 and the second fiber is longer than the first fiber.

4. The automotive engine cooling system stop-leak formulation of claim 3 in which the weight ratio of the first fiber to the second fiber is between 1:4 and 1:8.

5. An automotive engine cooling system stop-leak formulation comprising a polymeric resin and a particulate package, wherein the particulate package comprises a first fiber having a first fiber length and a greater amount of a second fiber having a second fiber length, wherein the first fiber is wood flour and has a particle size distribution such that at least 90% are retained by a 100 µm screen but less than 1% are retained by a 600 µm screen.

6. An automotive engine cooling system stop-leak formulation comprising a polymeric resin and a particulate package, wherein the particulate package comprises a first fiber having a first fiber length and a greater amount of a second fiber having a second fiber length wherein the fibers are the natural fibers wood flour and oilseed meal.

7. The automotive engine cooling system stop-leak formulation of claim 6 in which the oilseed meal is an expelled linseed meal.

8. An automotive engine cooling system stop-leak formulation comprising a methyl methacrylate copolymer polymeric resin and a particulate package, wherein the particulate package comprises a first fiber having a first fiber length and a greater amount of a second fiber having a second fiber length.

9. The automotive engine cooling system stop-leak formulation of claim 8 in which the methyl methacrylate copolymer polymeric resin selected from a methyl methacrylate-ethyl acrylate copolymer or methyl methacrylate-butyl acrylate copolymer.

10. The automotive engine cooling system stop-leak formulation of claim 8 in which methyl methacrylate copolymer polymeric resin has an Mz average molecular weight between 100 000 and 400 000 Daltons.

11. The automotive engine cooling system stop-leak formulation of claim 8 in which the polymeric resin has a glass transition temperature between 30° C. and 80° C.

12. The automotive engine cooling system stop-leak formulation of claim 8 in which the weight ratio of the polymeric resin to the combined first and second fibers is between 1:0.5 and 1:1.5.

13. A method of repairing a coolant leak comprising introducing the automotive engine cooling system stop-leak formulation of claim 1 into an automotive engine cooling system and running the engine.

14. The method of claim 13 in which the automotive engine cooling system comprises a monoethylene glycol based cooling fluid.

* * * * *